United States Patent
Ben Ami et al.

(10) Patent No.: US 10,841,162 B2
(45) Date of Patent: Nov. 17, 2020

(54) TRANSITION FROM A LEGACY PBX SYSTEM TO AN ADVANCED IP-ENABLED SYSTEM

(71) Applicant: UNIVONIX LTD., Rehovot (IL)

(72) Inventors: Benjamin Abraham Ben Ami, Rehovot (IL); Simon Shaw, Shoham (IL)

(73) Assignee: UNIVONIX LTD., Rehovot (IL)

( * ) Notice: Subject to any disclaimer, the term of this patent is extended or adjusted under 35 U.S.C. 154(b) by 0 days.

(21) Appl. No.: 16/326,962

(22) PCT Filed: Aug. 21, 2017

(86) PCT No.: PCT/IL2017/050928
§ 371 (c)(1),
(2) Date: Feb. 21, 2019

(87) PCT Pub. No.: WO2018/037403
PCT Pub. Date: Mar. 1, 2018

(65) Prior Publication Data
US 2019/0215241 A1      Jul. 11, 2019

Related U.S. Application Data

(60) Provisional application No. 62/377,681, filed on Aug. 22, 2016, provisional application No. 62/377,682, filed on Aug. 22, 2016.

(51) Int. Cl.
*H04L 12/24* (2006.01)
*H04M 7/00* (2006.01)
(Continued)

(52) U.S. Cl.
CPC ........ *H04L 41/0883* (2013.01); *H04L 41/082* (2013.01); *H04L 41/0806* (2013.01);
(Continued)

(58) Field of Classification Search
CPC ............. H04L 41/0806; H04L 41/0813; H04L 41/082; H04L 41/0853; H04L 41/0866;
(Continued)

(56) References Cited

U.S. PATENT DOCUMENTS

2005/0259590 A1* 11/2005 Brown ................. H04Q 3/0075
370/250
2005/0273464 A1* 12/2005 Brown ................. H04Q 3/0062
(Continued)

FOREIGN PATENT DOCUMENTS

EP       2100438 A1    9/2009
WO  2009089844 A1    7/2009

*Primary Examiner* — Michael C Lai
(74) *Attorney, Agent, or Firm* — Browdy & Neimark, PLLC

(57) ABSTRACT

A method is provided for replacing an enterprise legacy PBX with an advanced IP-enabled system, comprising: (i) providing configuration data of the legacy PBX; (ii) analyzing the data provided, and detecting missing details from among the legacy PBX configuration data; and detecting conflicts that exist among the legacy PBX configuration data; (iii) retrieving information associated with missing details by approaching data source(s) other than the source for the legacy PBX configuration data, and resolving detected conflicts; (iv) converting data associated with the users of the legacy PBX for use by a system implementing an advanced IP-enabled solution; and (v) configuring the advanced IP-enabled system accordingly.

12 Claims, 4 Drawing Sheets

(51) Int. Cl.
*H04M 3/42* (2006.01)
*H04L 12/58* (2006.01)
*H04L 29/06* (2006.01)

(52) U.S. Cl.
CPC ...... *H04L 41/0813* (2013.01); *H04L 41/0853* (2013.01); *H04L 41/0866* (2013.01); *H04L 41/0889* (2013.01); *H04L 41/0893* (2013.01); *H04L 51/36* (2013.01); *H04L 65/1053* (2013.01); *H04M 3/42314* (2013.01); *H04M 7/009* (2013.01)

(58) Field of Classification Search
CPC ............. H04L 41/0883; H04L 41/0889; H04L 41/0893; H04L 51/36; H04L 65/1053; H04M 3/42314; H04M 7/009
See application file for complete search history.

(56) References Cited

U.S. PATENT DOCUMENTS

| | | | |
|---|---|---|---|
| 2008/0159273 A1* | 7/2008 | Brugman | H04L 12/66 370/356 |
| 2008/0186958 A1* | 8/2008 | O'sullivan | H04L 65/1053 370/356 |
| 2010/0162034 A1* | 6/2010 | Degenhardt | H04L 65/1053 714/4.11 |

* cited by examiner

TRANSITION FROM A LEGACY PBX SYSTEM TO AN ADVANCED IP-ENABLED SYSTEM

TECHNICAL FIELD

The present invention relates in general to the field of enterprise communications, and in particular to methods for migrating legacy based PBXs to advanced IP-enabled solutions.

BACKGROUND

Enterprise telephony is a mature technology that exists since the 60s of the 20th century and plays a critical role in enterprise communications. Since the beginning of the millennium, there is a constant migration from legacy TDM (time division multiplexing) based PBXs (Private Branch Exchanges) to Internet Protocol (IP) based ones. Today, most of the telephony solutions are IP-enabled or IP-PBX solutions. The corporate telephony market is evolving from suppling pure telephony services to providing Unified Communications solutions.

As will be appreciated by those skilled in the art, the already existing corporate communication systems need now to be upgraded for any one of a plurality of reasons. It might be due to the fact that existing equipment is aging, thus, being harder and costly to maintain. Other reason may be a nearing end of contract/end of life. Typically, there is a good chance that the legacy equipment would not fit today's working environment, as it might offer a poor support for teleworkers, mobile phones, employee availability and the like.

Consequently, organizations are now willing to take a step of moving towards more modern systems. However, notwithstanding the above, they would typically prefer that the new systems will maintain the functionalities of their existing systems while adding new functionalities thereto.

Also, it should be noted that communication infrastructure is an essential component of any modern organization, and replacing it might have a huge impact on the daily operations as well as on the whole business.

Migrating large business customers from a legacy telephony system, such as a TDM based PBX, to an advanced IP-enabled system, such as for example Skype® for Business, is a rather complex task, for at least the following reasons:

Typically, the legacy configuration is a complex configuration, one which is not well-documented. Each user and each phone associated with the system have typically many attributes and features configured therefor, from line behavior such as "forward on busy", to phone configuration of speed dials. Even when the communication system of a medium size organization is to be upgraded, getting the configuration is a challenging task, as the configuration usually spans over a vast number of physical devices and contains thousands of records.

Data cleanup and conflicts resolution—the existing configuration comprises redundant legacy data, such as information associated with former employees, old telephone extensions, etc. Moreover, due to lack of data consistency (e.g. an employee email address has been deleted but this extension number is still configured), converting the data may result in incorrect details being assigned to certain users. When migrating to a new system, it is essential that data cleanup be carried out.

Mapping entities from the legacy PBX to Skype for Business ("SfB"). In many cases the PBX configuration is based on phone lines/extensions, whereas the SfB configuration is based on users. When Converting the data, the line information needs to be mapped into (associated with) the users.

Lack of feature parity between legacy PBX and the advanced IP-enabled system further complicates the migration task and requires an in depth understanding of how these features are implemented both in the advanced IP-enabled system as well as in the Legacy PBXs. For example, in many PBX systems a user can have multiple phone numbers while Skype for Business, being an example of an advanced IP-enabled system, supports only a single phone number per user (and a single private line). Other examples include, lack of features in Skype for Business such as forward on busy, time based call routing and the like. When switching to Skype for Business, the data model needs to be converted—the legacy system configuration paradigm needs to be adapted to Skype for Business. In some cases, where there is no feature parity between the systems, some mitigation strategies can be applied, while in other cases, the user of such feature needs to be notified ahead of the transition.

Some of the telephony systems includes features that are not necessary related to a particular user or relates to a group of users. Such feature includes call hunt, call pickup and call park. The implementation of such features can also be different between the legacy telephony system and the new target system. For example, Cisco Call Manager supports adding any phone number to a call hunt group whereas Skype for Business supports only users in their hunt groups. Other examples may be for instance the following. The phone numbers in Skype for Business must be in E.164 form. Hence one needs to apply certain normalization rules in order to translate extension numbers that are currently used in Cisco/Avaya systems into the required E.164 form.

Still other examples may be routing algorithms, different call park configurations, and the like.

Migrating to the advanced IP-enabled system requires extensive manual labor—from reading and investigating the current configurations to configuring all the users and their designated features. When the install base includes hundreds and thousands of users, this is a cumbersome task which can take a long period of time as well as introduce many human errors in the configuration.

Understanding the configuration of the current system requires expertise in the legacy system, and at the same time expertise is also required to configure the target system. Engineers that have deep understanding of both systems are rare, they are in high demand and their charge is rather high.

Another migration challenge may emerge in case a customer has PBXs that were purchased from multiple vendors. When dealing with large enterprises, they may often have PBXs that were purchased from different vendors (due to M&As, global companies working in different regions, etc.). In such a case, the system integrator must have a deep understanding of different technologies which are in use prior to the migration.

Switching from legacy systems to advanced IP-enabled systems is a complex project. It can involve many teams, from solution engineers that define the architecture of the solution and the network, to field engineers that travel to the various sites, install and configure the equipment. In large organizations having thousands of users, such a project might take months before completed. Also, because migration projects are complex, they tend to take long periods of time (i.e. months and years). Obviously, during such a long period of time the configuration of the legacy PBX would change (e.g. people join and leave the company, people change positions and their phone number change, people get married and change their names, etc.). The system should be able to detect such changes (commonly known in the industry as MACD—Move, Add, Change, Delete) and update the migration information without overwriting the work done. Let us consider the following example. The system integrator started working on the legacy configuration at T0. He then cleaned the data, fixed conflicts etc. A month after T0, he loaded a new snapshot of the legacy PBX configuration to the migration system. Now, the system should not be allowed to override all the changes that have already been affected by the system integrator.

In view of the above, it is obvious that the configuration conversion is likely to be a quite complex task, labor intensive and prone to human error. Carrying such a process manually, is virtually an impossible task.

Therefore, a solution is required to enable reducing migration time as well as to shorten time to service, in order to significantly improve the economics involved with the process.

SUMMARY OF THE DISCLOSURE

The disclosure may be summarized by referring to the appended claims.

It is an object of the present invention to provide a method and a computer program product, to enable replacing legacy based PBXs (such as TDM based PBXs, IP-based PBXs) with advanced IP-enabled solutions. The term "advanced IP-enabled solution" or "advanced IP-based system" is used herein to denote a system which is a unified communication system, namely a system that is adapted to integrate real-time, enterprise, one or more communication services such as IM (instant messaging), presence information, voice, web and video conferencing, etc. with non-real-time communication services such as unified messaging (integrated voice-mail, e-mail, SMS and fax).

It is another object of the present invention to provide a method and a computer program product, to enable capturing and reporting data associated with users (the term "users" as used herein throughout the specification and claims is used to denote individual users, hunting groups, pickup groups, call park, and the like) and communication devices serviced by legacy based PBXs or IP-PBX, thereby allowing replacement of the legacy based PBXs by advanced IP-enabled solutions.

It is still another object of the present invention to provide a method and a computer program product to enable an enterprise in which a legacy based PBX or IP-PBX is being replaced with an advanced IP-enabled solution, to operate during a transition period at which both the legacy based PBX (or the IP-PBX) as well as the advanced IP-enabled solution, co-exist.

Other objects of the present invention will become apparent as the description of the invention proceeds.

In one embodiment, there is provided a method for replacing a legacy PBX or an IP-PBX (hereinafter: "legacy PBX") of an enterprise with an advanced IP-enabled system, wherein the method comprises the steps of:

(i) providing configuration data of a legacy PBX retrieved from a medium to large enterprise (e.g. one that is associated with at least a hundred users and at least a hundred of communication devices);

(ii) analyzing the data provided, and
  a) detecting at least one missing detail from among the configuration data provided, which should be included among data that will be utilized for configuring the advanced IP-enabled system; and
  b) detecting at least one conflict that exists among the data associated with the configuration of the legacy PBX;

(iii) retrieving information associated with at least one detected missing detail, by approaching at least one data source other than the source from which the configuration data of the legacy PBX was provided, and resolving at least one detected conflict;

(iv) converting data associated with the users of the legacy PBX for use in a system implementing an advanced IP-enabled solution (e.g. converting a plurality of telephone numbers and extension numbers associated with the users and emulating features and/or behaviors which are not included among the data provided); and (v) generating configuration data for provisioning the advanced IP-enabled system accordingly.

By yet another embodiment the method provided further comprises the steps of:

(vi) generating modified configuration data for the legacy PBX system; and (vii) re-configuring the legacy PBX system in accordance with the modified configuration data to enable the legacy PBX system and the advanced IP-enabled system to operate simultaneously as a unified system for that enterprise.

According to another embodiment the advanced IP-enable system is Skype for Business.

According to still another embodiment, the legacy PBX is a member selected from among a group that includes Cisco Call Manager™, Avaya IP Office™, Avaya Communication Manager™, Unify OpenScape™, and the like.

In accordance with another embodiment, step (ii) further comprising generating (preferably automatically) one or more reports based on the analysis made.

By yet another embodiment the one or more reports comprise a list of users that can automatically be migrated, a list of users who may be partially migrated due to lack of feature parity (e.g. users that are configured with features such as forward on busy) and a list of users for whom some guidance on how to migrate them will be required (e.g. users whose e-mail addresses are found in the legacy system, but a respective user was not found in the active directory).

According to still another embodiment step (iv) comprises matching a respective user name to each of the e-mail addresses comprised in the data provided, and in case no respective user name can be matched to a certain e-mail address, retrieving other details from among the data provided that may be matched to the e-mail address to which no user name could have been matched.

By still another embodiment, step (i) further comprises dividing the users into at least two groups of users (e.g. a group of users may comprise users that are associated with the same physical site, users that are associated with a certain device pool, etc.) and preferably repeating steps (ii) to (v) for each of the at least two groups of users, separately.

In accordance with another embodiment, step (v) further comprises generating a status report of the new configuration (e.g. users, devices, hunting groups, pickup groups etc.)

that can be migrated with a list of caveats of features that will not be migrated, before configuring the advanced IP-enabled system accordingly.

According to another aspect of the disclosure there is provided a computer program product encoding a computer program stored on a non-transitory computer readable storage medium for executing a set of instructions by a computer system comprising one or more computer processors for carrying out a method for enabling replacement of a legacy PBX of an enterprise by an advanced IP-enabled system, the method comprising the steps of:

(i) receiving configuration data of a legacy PBX retrieved from a medium to large enterprise (e.g. one that is associated with at least a hundred users and at least a hundred of communication devices);

(ii) analyzing the data provided, and
  a) detecting at least one missing detail from among the configuration data provided, which should be included among data that will be utilized for configuring the advanced IP-enabled system; and
  b) detecting at least one conflict that exists among the data associated with the configuration of the legacy PBX;

(iii) retrieving information associated with at least one detected missing detail, by approaching at least one data source other than the source from which the legacy PBX configuration data was received, and resolving the at least one detected conflict;

(iv) converting data associated with the users of the legacy PBX for use in a system implementing an advanced IP-enabled solution (e.g. converting a plurality of telephone numbers and extension numbers associated with the users and emulating features or behaviors which are not included among the data provided); and (v) generating configuration data for provisioning the advanced IP-enabled system accordingly.

According to another embodiment of this aspect, the method further comprises the steps:

(vi) generating modified configuration data for the legacy PBX system; and (vii) re-configuring the legacy PBX system according to the modified configuration data, thereby enabling the legacy PBX system and the advanced IP-enabled system to operate simultaneously as a unified system for that enterprise.

DETAILED DESCRIPTION

A better understanding of the present invention will now be obtained when the following non-limiting detailed description is considered in conjunction with the following drawings.

Figure 1:
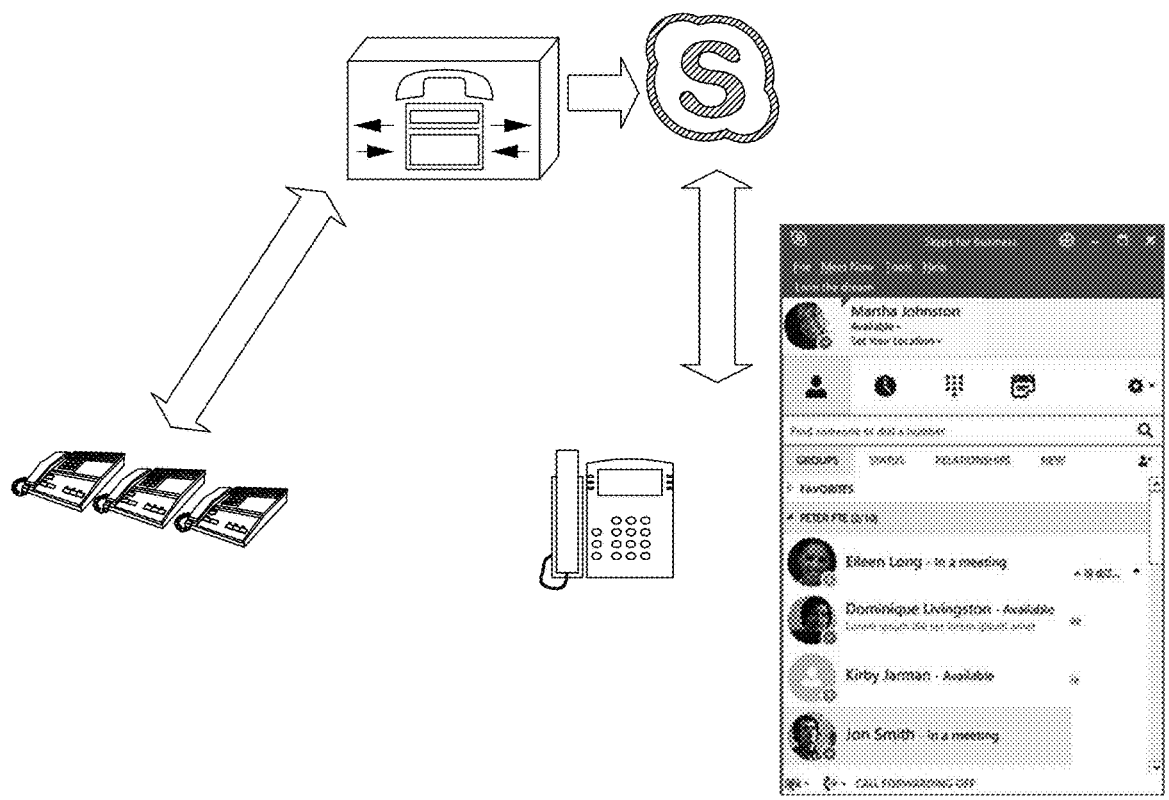
FIG. 1—illustrates a schematic view of an enterprise in which a migration process takes place whereby a legacy PBX system is replaced by an advanced IP-enabled system.

FIG. 1 illustrates a schematic view where a migration process takes place in a medium to large enterprise, whereby a legacy PBX system such as Cisco Call Manager™, Avaya IP Office™ and the like is replaced by an advanced IP-enabled system, such as Skype for Business.

Figure 3:
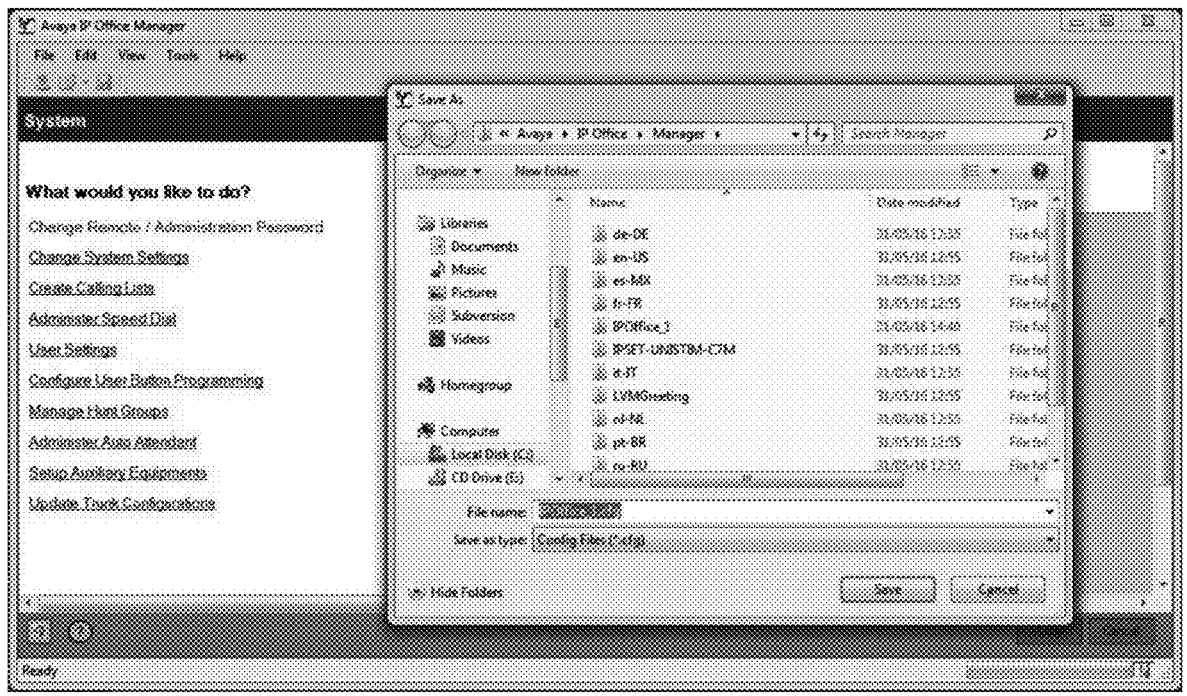
FIG. 3—exemplifies a screen shot illustrating a legacy PBX configuration export.
Figure 2:
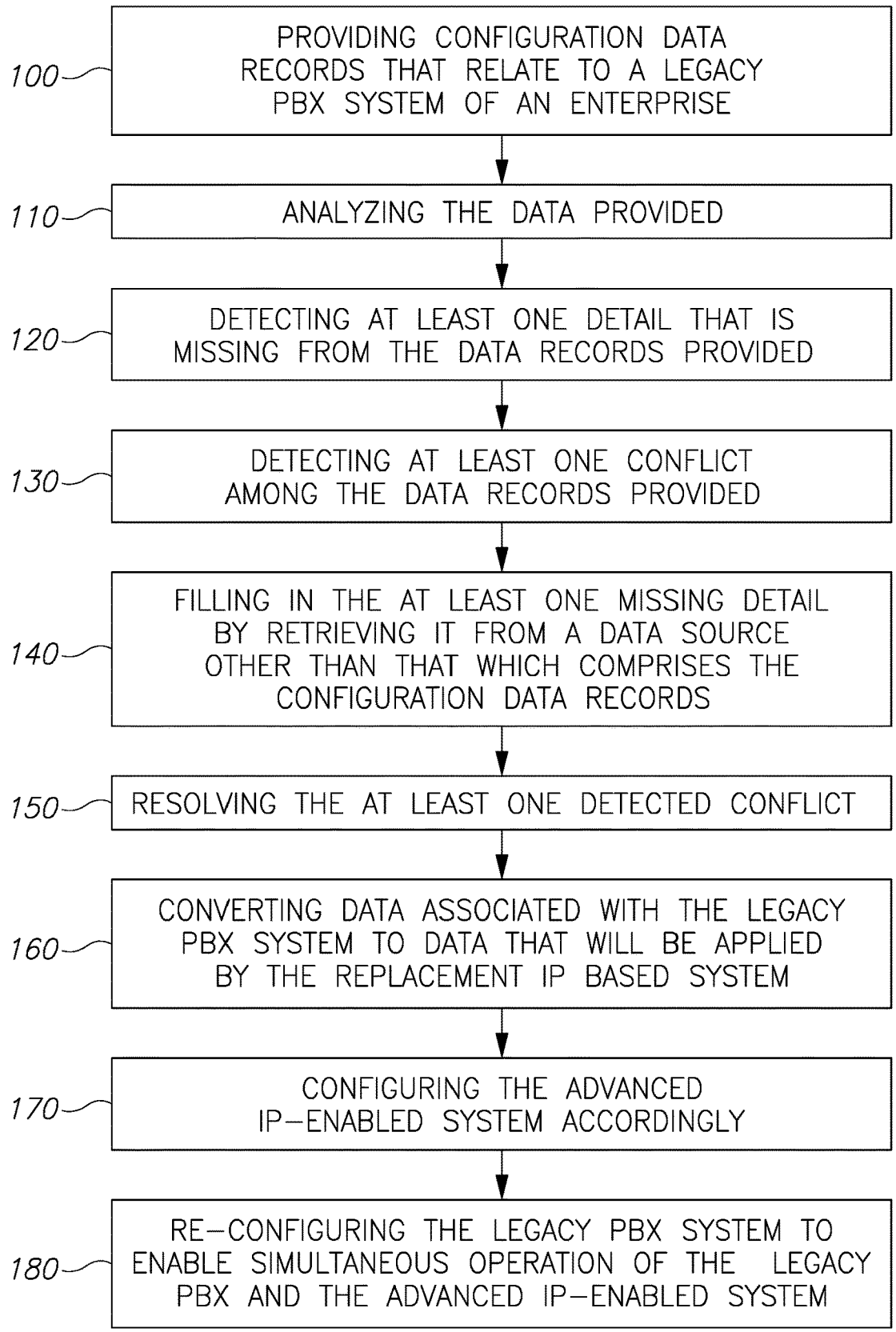
FIG. 2—illustrates a flow chart exemplifying a method for enabling replacement of a legacy PBX of an enterprise with an advanced IP-enabled system.

A flow chart exemplifying a method for enabling replacement of the legacy PBX with the advanced IP-enabled system is illustrated in FIG. 2, showing an embodiment of the invention:

The first step (step 100) according to this embodiment is providing configuration data records that relate to the legacy PBX system (i.e. the source system) and possibly also organizational information. This step may be carried out by extracting the configuration data records from the legacy PBX system. One option for carrying out such a configuration export is by using the legacy system management console/web interface. The customer's system administrator logs into the legacy system, activates an export command and downloads the existing configuration (see for example FIG. 3). In some cases, a software may be connected to the legacy PBX and extract the required information therefrom. The extracted configuration would typically be an archive file (e.g. zip/tar file) that contains hundreds of files. The configuration of Skype for Business, which is the advanced IP-enabled solution exemplified herein, is based on users' details configured within an Active Directory, hence when generating its configuration, a list of details that characterize the various users (such as e-mail addresses, first name/last name, extension number, and the like) would be required. A short PowerShell script may extract the relevant information into a CSV file which will then be used in the migration process.

Figure 4:
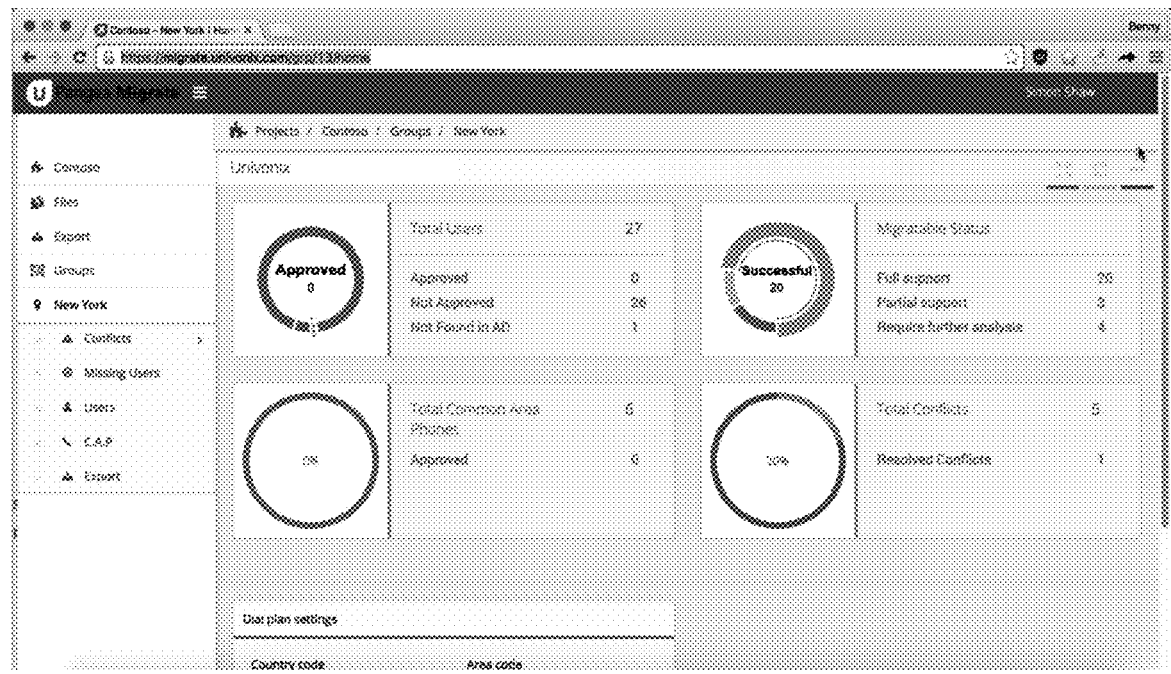
FIG. 4—exemplifies a screen shot illustrating the status of the migration process from the legacy PBX to the advanced IP-enabled PBX.

The thus provided/extracted configuration data is uploaded to a system that manages the migration process, such as the Univonix Migrate™ system, where the uploaded data is analyzed (step 110) by one or more processors, and the one or more processors preferably generate a number of status reports. An example of such a report is illustrated in FIG. 4. These reports include for example a list of all users whose associated configuration data can be automatically migrated, a list of users whose related data may be partially migrated due to lack of feature parity (e.g. users that are configured with features such as forward on busy) and a list of users for whom the system needs some further guidance as to how should their associated data be migrated (e.g. users that are found on the legacy system, but a no respective user was not found in the active directory).

As will be appreciated by those skilled in the art, there is a difference between features configured in the legacy PBX and features that are actually used, as in some cases, features are configured but not used. Thus, according to an embodiment of the solution provided by the present invention, call details records (CDRs) retrieved from the legacy PBX are analyzed to determine which entries (lines) are actually being used and which features are active. This information may in turn be used to clean up the configuration (i.e. to eliminate unused features) prior to its migration. Obviously, this information should be applied with extra care to avoid errors, such as the following example. Let us consider a case where a hunt group for emergency calls seems to be inactive (i.e. no calls were made to this number during the last three months) since no fires occurred in the building during that period, consequently, the hunt group might be considered as one that has not been in use, yet, one must be careful not to eliminate this group even though it seems prima facie that the group had not been in use.

According to yet another embodiment of the present invention, the method provided further comprises a step of detecting dependencies that exist between users/entities within the legacy PBX. Preferably, when entities (e.g. users)/lines depend on other entities/lines, the system would alert and/or prevent an automatic migration of data, in order to ensure that no functionality is lost unintentionally. For example, the system may be configured to prevent automatic migration of a manager if his/her assistant is not also being migrated at the same time and remains with the legacy system (or vice versa). Another example for this embodiment can be that a user would not be automatically migrated if he/she belongs to a hunt group, and that hunt group is not yet migrated.

According to a further embodiment of the present invention, one or more PBX assessment reports are generated. Such a report may comprise information the relates to current deployment of the PBX (current phone inventory, e.g. the number of video phones that are included in the system, the number of IP phones, the number of conference phones, etc.) as well as feature parity analysis (e.g. which features are configured in the PBX and whether these features may be automatically converted into the target system). The data comprised in such a report may further be divided into groups (e.g. the inventory and usage in New York as opposed to the inventory and usage in London, feature parity for each group, etc.). In addition, the solution provided by the present invention enables migrating Auto Attendant (IVR) configuration, in other words, the migration of various menus and prompts. The feature-parity analysis is also applicable for this case as the IVR is implemented differently in systems provided by different vendors (e.g. if Cisco system is used, one may have as many levels of menus as one wishes, whereas using Skype for Business, allows only four such levels.

The reports discussed above, may be of help for a system integrator to better plan a migration project and a project plan, estimate the expected price based on real data rather than on assumptions which might be inaccurate, and consequently be more competitive with its price offering.

The same report may be of help for the end customer to enable the latter to make a decision whether to make the transition to the new system.

In addition, according to a further embodiment, when the enterprise is a large enterprise, the configuration may be divided into a number of groups of users. For example, groups that are based on the physical location at which the user is employed, groups of users that belongs to a certain device pool, etc. According to this embodiment, the following steps will be repeated for each of the users' groups.

At this stage, an initial automated report may be generated, allowing both the system integrator (SI) and the end customer to obtain a better understanding of the upcoming migration project, predict possible areas of conflict, focus on issues that are likely to require decisions' taking, etc.

In the following steps, the one or more processors of the migrating system detects the details that are missing from the analyzed data records (step 120) such as for example the length of the extension number, area code etc., as well as conflicts that exists between data included in the configuration data records (step 130), e.g. a line shared between two users. In this process, once the configuration files have been uploaded, the system tries to map the legacy PBX users/phone lines/extensions into AD users. In some cases, this may turn to be a relatively simple task (e.g. if the PBX is configured with users' e-mail addresses), whereas in other cases, some heuristics needs to be applied. One of the results of this mapping, is that the system detects users with missing details (e.g. users that the system cannot map between legacy PBX and the SfB), conflicts (e.g. the same telephone line is mapped to two users), etc.

Figure 5:
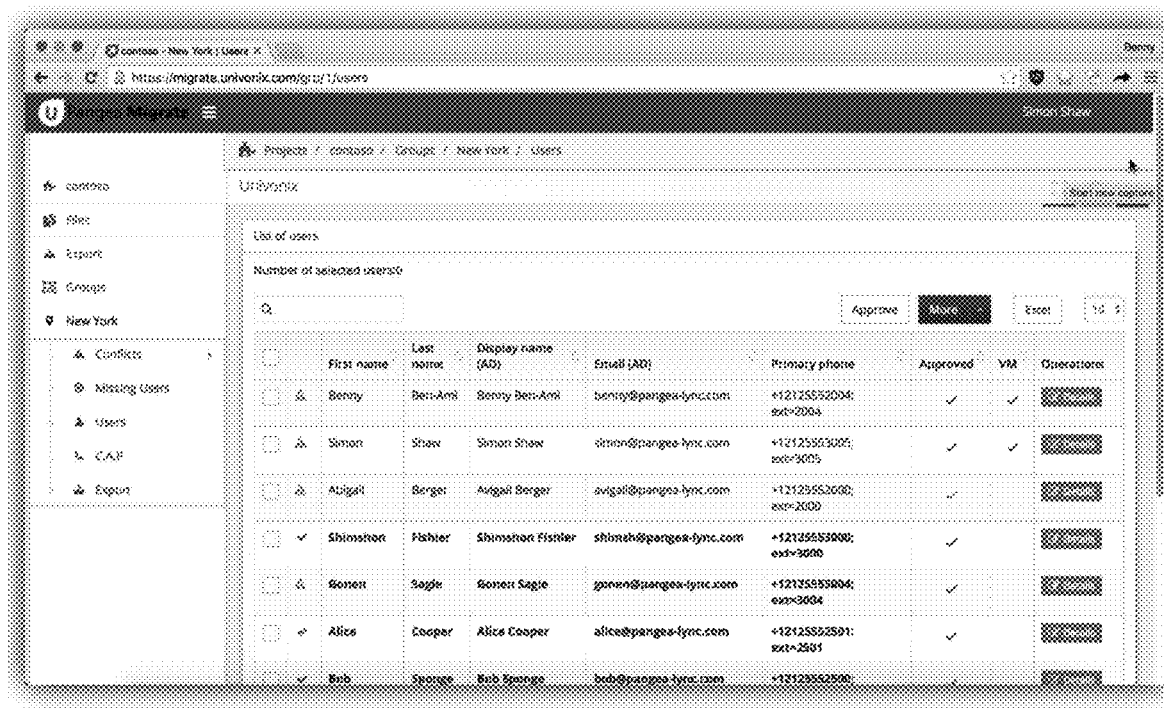
FIG. 5—exemplifies a screen shot illustrating the resolving of conflicts detected among the data records provided.

The missing details are then retrieved from a data source other than the configuration data records (for example, details retrieved from human resources' records) in order to complete the records that will be migrated to the advanced IP-enabled system (step 140) and the detected conflicts are resolved (step 150), as illustrated for example in FIG. 5.

Figure 6:
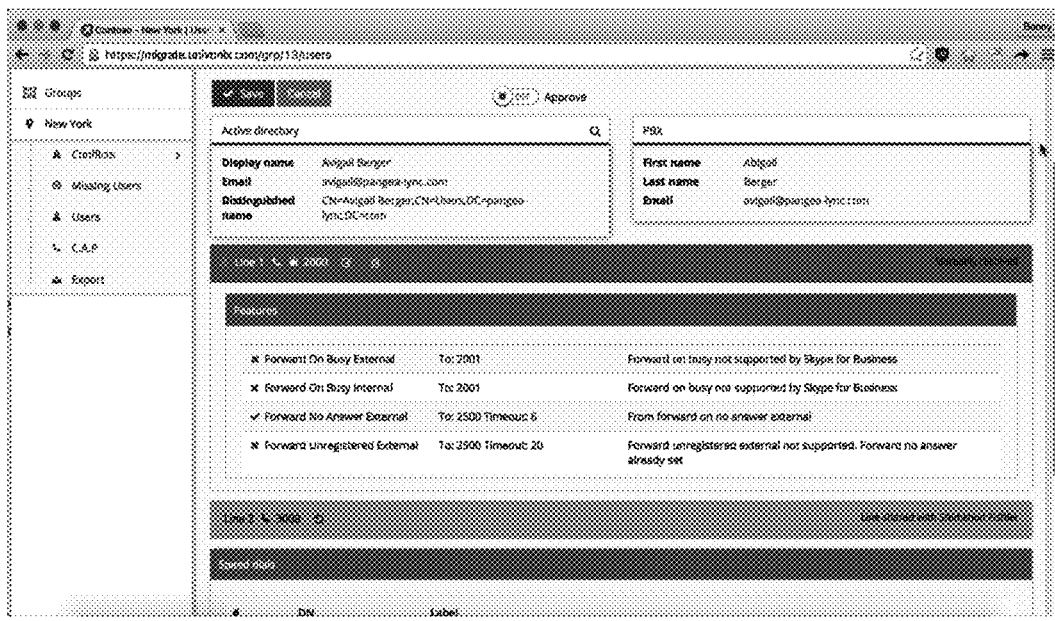
FIG. 6—exemplifies a screen shot illustrating the modification of data in order to have it adapted to the resolved conflicts.

Once missing details are filled in and existing conflicts are resolved, the Pangea Migrate system carries out (step 160) conversion of the phone numbers and extensions accordingly, and when possible, emulate missing features or behaviors, thereby leaving a minimal work to be done manually, if at all. An example of this step is illustrated in FIG. 6.

Next, according to this example, the system's processor generates a status report of the new configuration (comprising for example user names, devices, hunting groups, pickup groups etc.) that may be migrated to the advanced IP-enabled system, preferably accompanied by a list of caveats of features that will not be migrated. After the configuration is reviewed and approved by the end customer, the system can generate all the necessary configuration data for the advanced IP-enabled solution, Skype for Business (step 170).

Figure 7:
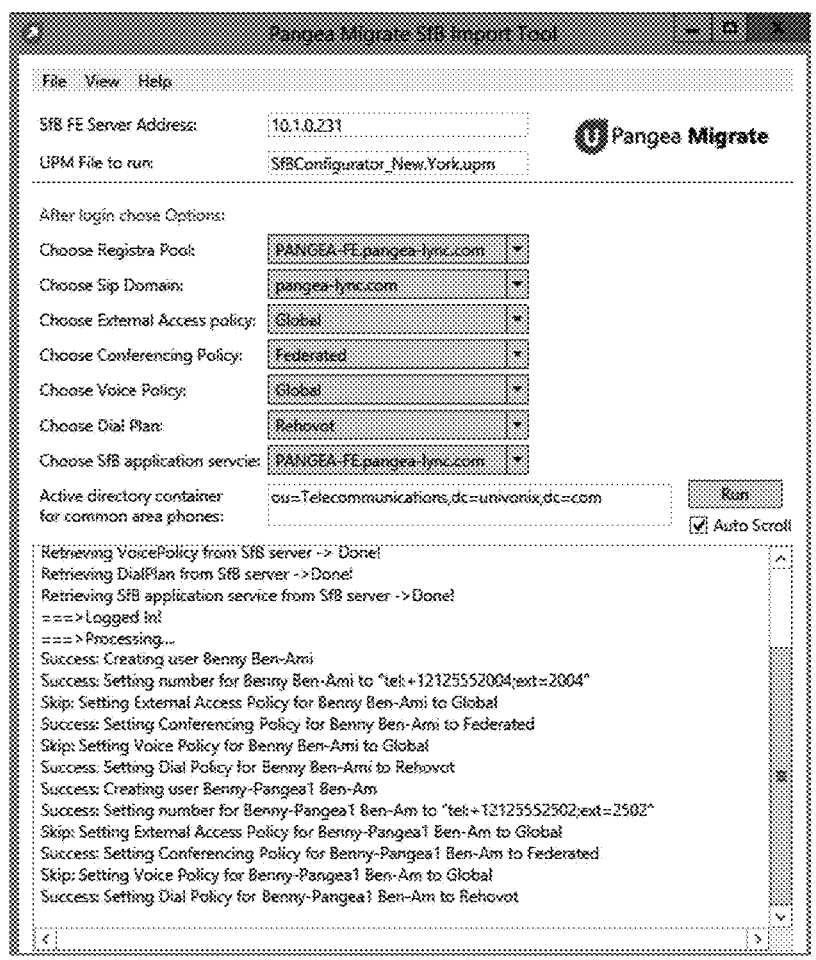
FIG. 7—exemplifies a screen shot illustrating configuration of Skype for Business as an example of an advanced IP-enabled system to which legacy PBX has been migrated.

At the final stage of the migration process, the system's processor generates configuration data for Skype for Business as illustrated in the example presented in FIG. 7, which is later used for configuring the SfB, and thereafter the system becomes operational. Obviously, as will be appreciated by those skilled in the art, once the migration system has generated the configuration data, it may invoke API (application program interface) calls in order to configure the advanced IP-enabled system. In some cases, the migration system generates configuration file(s) from the configuration data. Also, the configuration file(s) is not necessarily downloaded to a front end (FE) server, and instead it may be connected to the SfB FE via the network, while configuring the SfB. In case that the advanced IP-enabled system is resides in an IP cloud (e.g. Microsoft Cloud PBX), this part of the process may be carried out directly via API calls, without generation the configuration file(s).

In the case that the migration project is due to take a relatively long period (e.g. in case the deployment is for an enterprise that has a number of branches located at different geographical sites), not all the users can be moved at the same time from the legacy PBX system to the advanced IP-enabled system, and therefore the two systems, i.e. the legacy PBX system and the advanced IP-enabled system, should operate for quite some time simultaneously as a unified system within that enterprise. In this case, it is required that users are provided with the ability to communicate between the two systems, to update the legacy PBX system with the user details that have already been migrated to the advanced IP-enabled system, etc. Therefore, the system would generate new configuration data for Skype for Business/Exchange Voice Mail system and modified configuration data associated with the legacy PBX system (step 180), to enable re-configuring the legacy PBX system accordingly, so that the two systems (the legacy PBX system and the advanced IP-enabled system) may operate side by side within that enterprise. The system described hereinabove, may also be able to detect changes (commonly known in the industry as MACD—Move, Add, Change, Delete) and update the migration information without overwriting the work that has already been done.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features.

Variations of embodiments of the present invention that are described and embodiments of the present invention comprising different combinations of features noted in the described embodiments will occur to persons of the art. For example, reference was made in the description to detecting the number of times that a visual message was provided to a specific user. However, it should be understood that the methods provided may also be implemented on a vast number of users, while the steps of the disclosed methods are conducted for each of the users, as if that user is the specific user referred to herein. Thus, the scope of the invention is limited only by the following claims.

The invention claimed is:

1. A method for replacing a legacy PBX of a medium to large enterprise, with an advanced IP-enabled system, being a target system, wherein the method comprises the steps of:
   (i) providing configuration data of the legacy PBX retrieved from the medium to large enterprise;
   (ii) analyzing the configuration data of the legacy PBX and determining whether the configuration data of the legacy PBX can be migrated unchanged to the target system, and
      a) detecting at least one missing detail from among the provided configuration data of the legacy PBX, which should be included among data that will be utilized for configuring the target system; and
      b) detecting at least one conflict that exists among the data associated with the configuration of the legacy PBX;
   (iii) retrieving information associated with at least one detected missing detail, by approaching at least one data source other than the source from which the configuration data of the legacy PBX was provided, and resolving at least one detected conflict;
   (iv) carrying out an automated process for converting data associated with users of the legacy PBX into configuration data for the target system implementing an advanced IP-enabled solution; and
   (v) carrying out an automated process for configuring the advanced IP-enabled system in compliance with the converted data, being the outcome of the automated conversion process carried out according to step (iv).

2. The method of claim 1, further comprising the steps of:
   (vi) automatically generating modified configuration data for the legacy PBX system, wherein said modified configuration data is generated to enable the legacy PBX system and the advanced IP-enabled system to operate side by side within said enterprise; and
   (vii) re-configuring the legacy PBX system according to the modified configuration data, thereby enabling the legacy PBX system and the advanced IP-enabled system to operate together simultaneously as a unified system for said enterprise.

3. The method of claim 1, wherein the advanced IP-enable system is Skype for Business.

4. The method of claim 1, wherein step (ii) further comprising generating one or more reports based on the analysis made.

5. The method of claim 4, wherein the one or more reports comprise a list of users that can be automatically migrated, a list of users who may be partially migrated due to lack of feature parity and a list of users for whom some guidance on how to migrate them will be required.

6. The method of claim 1, wherein step (iv) comprises matching a respective user name to all e-mail addresses comprised in the data provided, and in case no respective user name can be matched to a certain e-mail address, retrieving other details from among the data provided that may be matched to the e-mail address to which no user name could have been matched.

7. The method of claim 1, wherein step (i) further comprises dividing users into at least two groups of users and repeating steps (ii) to (v) for each of the at least two groups of users, separately.

8. The method of claim 7, wherein said method comprises a step of selecting users to be associated with a first of the at least two groups of users, and wherein the selected users of said first group are all associated with one or more common features.

9. The method of claim 8, further comprising a step of identifying at least one user that shares with one or more common features with a user from among the users included in said first group, and wherein said one or more shared common features are different from the one or more common features associated with the users belonging to said first group.

10. The method of claim 1, wherein step (v) further comprises generating a status report of the new configuration that can be migrated with a list of caveats of features that will not be migrated, before configuring the advanced IP-enabled system accordingly.

11. A computer program product encoding a computer program stored on a non-transitory computer readable storage medium for executing a set of instructions by a computer system comprising one or more computer processors for carrying out a method for enabling replacement of a legacy PBX of an enterprise by an advanced IP-enabled system, being a target system, the method comprising the steps of:
   (i) receiving configuration data of legacy PBX retrieved from an enterprise;
   (ii) analyzing the configuration data received of the legacy PBX, determining whether the configuration data can be migrated unchanged to the target system, and
      a) detecting at least one missing detail from among the provided configuration data of the legacy PBX, which should be included among data that will be utilized for configuring the target system; and
      b) detecting at least one conflict that exists among the data associated with the configuration of the legacy PBX;
   (iii) retrieving information associated with at least one detected missing detail, by approaching at least one data source other than the source from which the legacy PBX configuration data was received, and resolving at least one detected conflict;

(iv) converting data associated with users of the legacy PBX into configuration data for the target system implementing an advanced IP-enabled solution; and (v) generating configuration data for provisioning the advanced IP-enabled system in compliance with the converted data associated with the legacy PBX.

12. The computer program product of claim 11, wherein the method further comprising the steps of:

(vi) generating modified configuration data for the legacy PBX system wherein said modified configuration data is generated to enable the legacy PBX system and the advanced IP-enabled system to operate side by side within said enterprise; and (vii) re-configuring the legacy PBX system according to the modified configuration data, thereby enabling the legacy PBX system and the advanced IP-enabled system to operate together simultaneously as a unified system for said enterprise.

\* \* \* \* \*